US008824288B2

(12) United States Patent
Gao et al.

(10) Patent No.: US 8,824,288 B2
(45) Date of Patent: Sep. 2, 2014

(54) COMMUNICATIONS TECHNIQUES FOR BURSTY NOISE ENVIRONMENTS

(75) Inventors: Jie Gao, Sunnyvale, CA (US); Xintian Lin, Palo Alto, CA (US); Qinghua Li, San Ramon, CA (US); Hsin-Yuo Liu, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 722 days.

(21) Appl. No.: 12/960,614

(22) Filed: Dec. 6, 2010

(65) Prior Publication Data
US 2012/0140647 A1    Jun. 7, 2012

(51) Int. Cl.
*H04L 12/26* (2006.01)

(52) U.S. Cl.
USPC ............................ 370/231; 370/310; 370/477

(58) Field of Classification Search
USPC .............. 370/229, 230, 230.1, 231, 232, 235, 370/236, 237, 310, 391, 477
See application file for complete search history.

(56) References Cited

U.S. PATENT DOCUMENTS

| 7,167,548 | B1 * | 1/2007 | Fedane ....................... 379/93.06 |
| 7,532,642 | B1 * | 5/2009 | Peacock ........................ 370/468 |
| 8,014,400 | B2 * | 9/2011 | Zhang ........................... 370/392 |
| 8,289,845 | B1 * | 10/2012 | Baldonado et al. ............ 370/230 |
| 2002/0194609 | A1 * | 12/2002 | Tran .................................. 725/95 |
| 2004/0095908 | A1 * | 5/2004 | Wu et al. ........................ 370/335 |
| 2006/0159098 | A1 * | 7/2006 | Munson et al. ................ 370/394 |
| 2006/0168343 | A1 * | 7/2006 | Ma et al. ........................ 709/245 |
| 2009/0228983 | A1 * | 9/2009 | Qin et al. ......................... 726/26 |
| 2010/0135178 | A1 * | 6/2010 | Aggarwal et al. ............. 370/252 |
| 2010/0202441 | A1 * | 8/2010 | Haag et al. ..................... 370/352 |
| 2010/0220663 | A1 | 9/2010 | Sawahashi et al. |
| 2010/0246429 | A1 | 9/2010 | Hwang et al. |
| 2011/0010444 | A1 * | 1/2011 | Everett et al. ................. 709/223 |
| 2011/0319071 | A1 * | 12/2011 | Beppler et al. ................ 455/424 |

FOREIGN PATENT DOCUMENTS

| KR | 10-2009-0051864 A | 5/2009 |
| WO | 2012/078326 A2 | 6/2012 |
| WO | 2012/078326 A3 | 8/2012 |

OTHER PUBLICATIONS

International Search Report and Written Opinion received for PCT Patent Application No. PCT/US2011/061081, mailed on Jun. 29, 2012, 9 pages.
International Preliminary Report on Patentability and Written Opinion Received for PCT Patent Application No. PCT/US2011/061081, mailed on Jun. 20, 2013, 6 pages.

* cited by examiner

*Primary Examiner* — Kwang B Yao
*Assistant Examiner* — Nguyen Ngo
(74) *Attorney, Agent, or Firm* — Sutherland Asbill & Brennan LLP

(57) ABSTRACT

Techniques are disclosed that involve communicating in bursty noise environments. For instance, a source device may send a probing packet to a destination device. This probing packet is for determining whether the communications medium (e.g., one or more frequency channels) is currently exhibiting a busy or jammed (e.g., due to bursty noise) condition. More particularly, based on whether an acknowledgment of the probing packet is received, the source device determines whether the channel is jammed (or busy) or clear. For example, an unacknowledged probing packet indicates that the channel is jammed or busy, while an acknowledged probing packet indicates that the channel is clear. If the channel is determined to be clear, then the source device may transmit one or more data packets to the destination device. Such data packet transmissions may be in accordance with a non rate-adaptive technique.

19 Claims, 13 Drawing Sheets ns techniques are not effective in such bursty noise environments.

COMMUNICATIONS TECHNIQUES FOR BURSTY NOISE ENVIRONMENTS

BACKGROUND

Devices are increasingly employing wireless communications techniques to provide high data rate user applications. Examples of such applications include (but are not limited to) video streaming in personal area network (PAN) mode and wireless display (WiDi) applications. Such applications can be very sensitive to packet loss. For instance, in the context of WiDi, a single packet loss can corrupt an image frame and introduce "banding" issues on the picture. Further, consecutive packet losses can cause more severe impact on the visual experience and produce a "freezing" effect.

Wireless communications devices are often confronted with interfering noise from various sources. In environments such as households, burst noise is common in the industrial scientific and medical (ISM) frequency band (2.4~2.5 GHz). Such noise may be caused by microwave ovens, co-located radios, and other devices. Typically, the on/off switching of such noise is quick. As a result, the quality of a channel may quickly alternate between two states: a clear state and a jammed state.

Link adaptation techniques may be employed to mitigate the effects of interfering noise. However, conventional link adaptation techniques are not designed for such quick alternations between jammed and clear states. As a result, such techniques may merely revert to employing a modulation and coding scheme (MCS) having a lower data rate. Unfortunately, this may reduce throughput to unacceptable levels.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION

Embodiments provide techniques for communications in bursty noise environments. For instance, a source device may send a probing packet to a destination device. This probing packet is for determining whether the communications medium (e.g., one or more frequency channels) is currently exhibiting a busy or jammed (e.g., due to bursty noise) condition. More particularly, based on whether an acknowledgment of the probing packet is received, the source device determines whether the channel is jammed (or busy) or clear.

For example, an unacknowledged probing packet indicates that the channel is jammed or busy, while an acknowledged probing packet indicates that the channel is clear. If the channel is determined to be clear, then the source device may transmit one or more data packets to the destination device. Such data packet transmissions may be in accordance with a non rate-adaptive technique. Embodiments may be employed in various IEEE 802.11 networks (e.g., IEEE 802.11a/b/g/n networks). However, embodiments are not limited to these networks.

As described above, bursty noise is frequently caused by co-located or closely located sources of RF energy. Different sources may exhibit different degrees of burstiness. For instance, a co-located Bluetooth radio may generate interference at a 10%-40% duty cycle, a traditional microwave oven may generate interference at a 10% duty cycle, an inverter type microwave oven may generate interference at a 50-60% duty cycle, and a WiFi radio (e.g., operating in a same channel, an adjacent channel, or an overlapping channel) may generate interference at a 10%-50% duty cycle (depending on the traffic pattern).

Figure 1A:
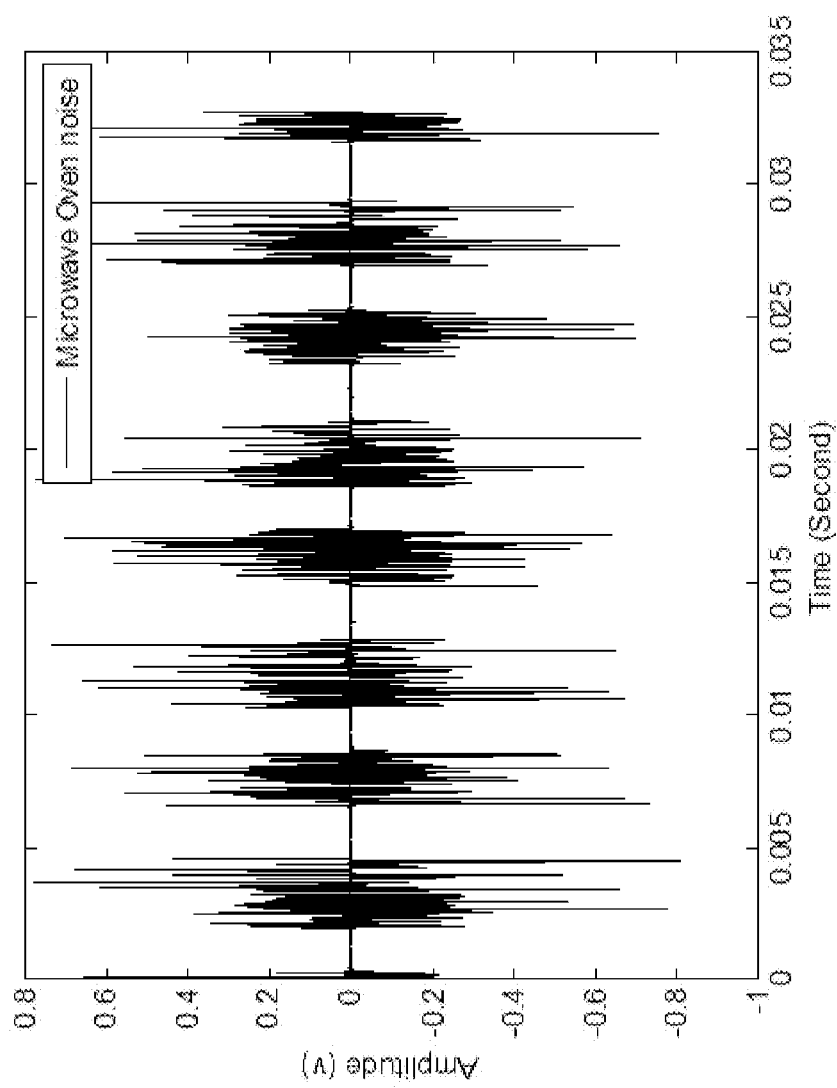
FIGS. 1A-1C are graphs showing noise from various sources.
Figure 1B:
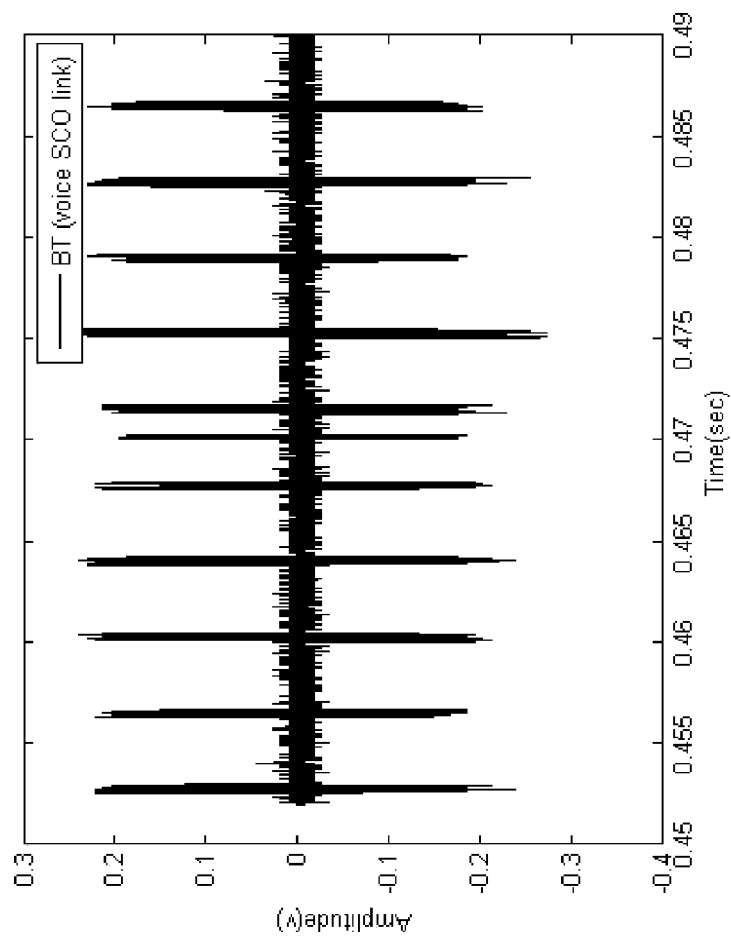
Figure 1C:
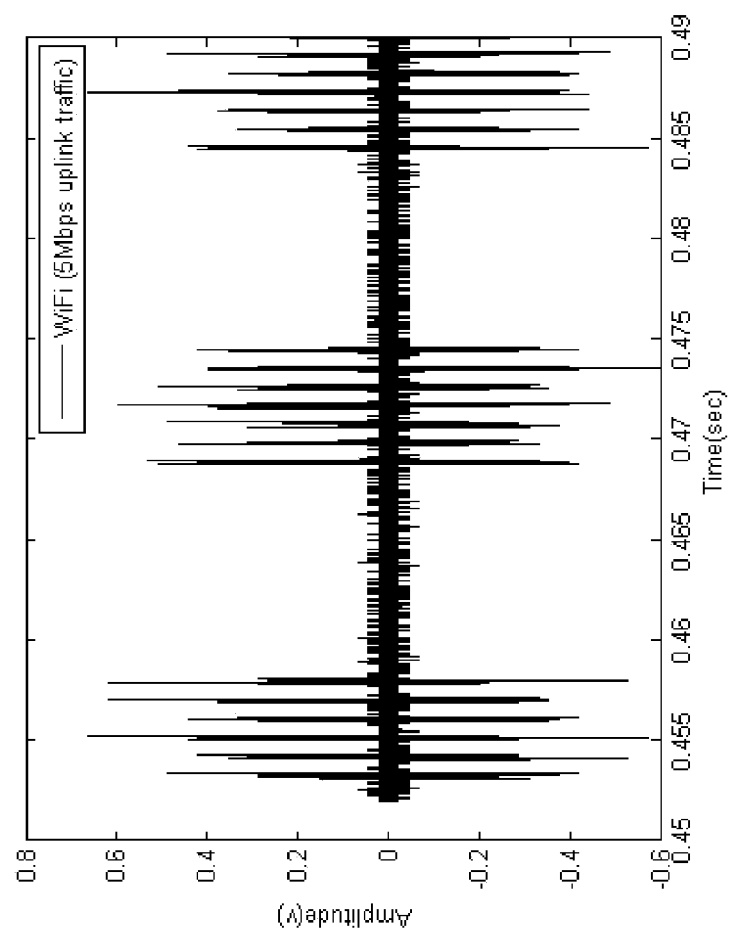

FIGS. 1A-1C provide graphs showing interference from different sources. In particular, FIG. 1A provides a graph 100 showing interference from a microwave oven. FIG. 1B provides a graph 110 showing interference from a Bluetooth radio (for voice traffic over an SCO link). FIG. 1C provides a graph 120 showing interference from a WiFi (IEEE 802.11) radio (for 5 mega bits per second (Mbps) uplink traffic).

As discussed above, link adaptation techniques are employed to overcome interference and noise. Conventional link adaptation techniques tend to reduce data rates when packets are not received correctly. These conventional techniques are suitable for non-bursty noise, such as additive white Gaussian noise (AWGN). This is because such noise is assumed to be present at all times. Thus, for such ever-present noise, data rate reductions may be effective (e.g., by providing lower bit error probabilities).

However, common "real life" environments exhibit noise that has a bursty nature (i.e., having "on" and "off" periods). For such bursty noise, conventional rate adaptation techniques are not effective. This is because, in the presence of bursty noise, data rate and/or MCS reductions not only increase the duration of data transmissions (e.g., WiFi packets), but also increase the probability of data packets colliding with the bursty noise. As a result, WiFi performance may eventually degrade.

Contrary to conventional approaches, embodiments may refrain from reducing data rates when faced with bursty noise environments. As a result, packet durations are not increased. This advantageously increases the chance of error free communications in a bursty noise environment.

Figure 2:
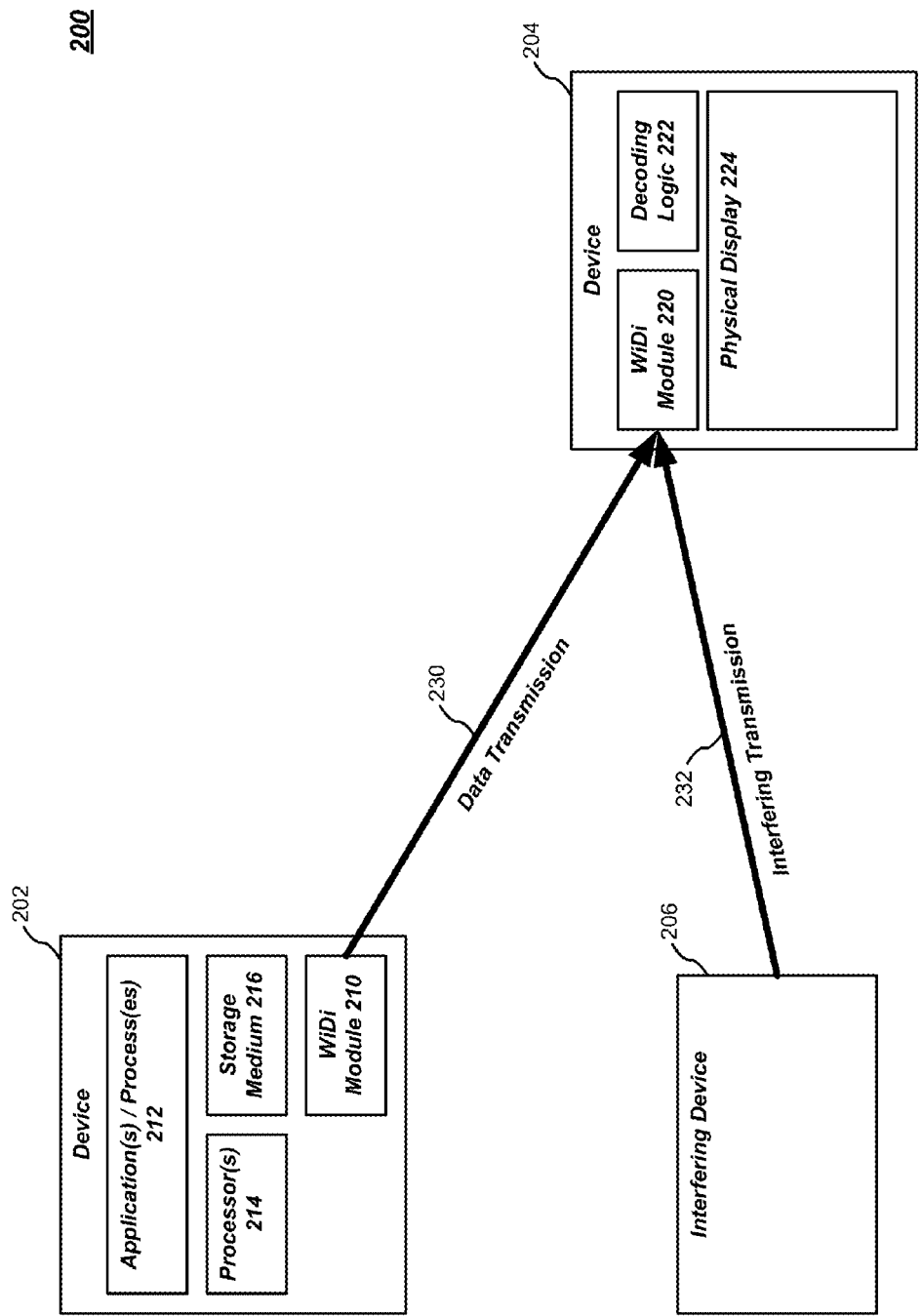
FIG. 2 is a diagram of an exemplary operational environment.

FIG. 2 is a diagram of an exemplary operational environment 200. In this environment, a first device 202 wirelessly sends a data transmission 230 to a second device 204. However, such wireless transmissions may be corrupted by interference. For instance, FIG. 2 shows an interfering device 206 generating an interfering transmission 232, which prevents data transmission 230 from being correctly received by device 204.

Such interfering transmissions may occur in a bursty manner. For instance, exemplary interfering transmissions may exhibit characteristics illustrated in FIG. 1. Thus, interfering device 206 may be, for example, a microwave oven, a co-located or proximate radio (e.g., a WiFi radio, a Bluetooth radio, etc.), or any other source of interference bursts.

In embodiments, device 202 may handle such bursty interference through probing techniques that determine whether the communications medium (e.g., the wireless channel) is currently in a state that exhibits bursty noise, or whether the communications medium is currently in a state that is substantially free from bursty noise. Based on this determination, device 202 adopts a corresponding communications technique.

In embodiments, the environment of FIG. 2 may be associated with (but is not limited to) a wireless display (WiDi) application. For instance, device 202 may be a computing platform, such as a personal computer (PC), a smartphone, a personal digital assistant (PDA), a notebook or laptop computer, as well as any other suitable device. In turn, device 204 may be a display device. During operation, device 202 transmits display data (e.g., data transmission 230) to device 204. This data may be encoded in various display, video, and/or image encoding formats. Upon receipt, device 204 may decode and display the received display data.

Device 202 may include various elements that may be implemented in any combination of hardware and/or software. For instance, FIG. 2 shows device 202 including a WiDi module 210 that generates wireless display data transmissions. This display data may be provided by one or more applications and/or processes 212 running on device 202. Such applications/processes may be executed by any combination of hardware and/or software. As an example, FIG. 2 shows device 202 including a storage medium (e.g., memory) 216 to store instructions associated with such applications and/or processes. Also, FIG. 2 shows device 202 including one or more processor(s) (e.g., microprocessor(s)) 214 to execute such instructions.

As shown in FIG. 2, device 204 includes a WiDi module 220 to receive wireless data. Further, FIG. 2 shows device 204 including decoding logic 222 to decode such display data, and a physical display device 224 to visually output the decoded display data. The elements of device 204 may be implemented in any combination of hardware and/or software. For instance, device 204 may include a storage medium (e.g., memory) and one or more processors to store and execute instructions that provide features of WiDi module 220 and decoding logic 222.

WiDi modules 210 and 220 may operate in accordance with various wireless networking standards. For instance, these modules may operate in accordance with one or more of the Institute of Electrical and Electronics (IEEE) 802.11 standards (WiFi standards). Embodiments, however, are not limited to such standards. Moreover, embodiments are not limited to wireless display uses.

Conventional IEEE 802.11 rate adaptation mechanisms are now described in greater detail. In accordance with such mechanisms, wireless communications devices may employ a driver that selects a data rate. This dynamic selection is aimed at providing the best long term estimated throughput among adjacent data rates. The device then uses this selected data rate as an initial data rate. The initial data rate determination process tracks the slow variation of signal and noise variations, such as variations caused by walking further away from the Access Point.

Based on this selection, the device creates a rate table. For example, a typical rate table contains 16 rates arranged in descending order (starting with the initial data rate as the highest rate). With this rate table, the device may perform (e.g., through the execution of micro-code) short-term rate adjustments.

Such short-term rate adjustments are made when packet failures occur (e.g., due to a weaker signal or a collision with interfering noise). For instance, if a packet failure occurs (e.g., if the device does not receive a corresponding ACK from the recipient device), the device will automatically resend the packet at a lower rate in the rate table. If a further packet is missed, then the device will transmit its following transmission at a next lower rate in the rate table. If the packet transmission is successful, the next transmission will resume with the initial data rate.

Thus, by reducing data rates, this technique can improve the packet success rate in AWGN (additive White Gaussian Noise) channels. However, this short-term adjustment technique can make packet durations increasingly longer. As described herein, such increased durations may reduce the probability of successfully transmitting packets in a bursty noise environment.

In addition to this approach, embodiments may employ techniques that probe the wireless channel (wireless medium). Such techniques may advantageously manage bursty noise environments without excessively increasing packet durations, as in the convention rate adjustment techniques described above.

Such techniques may involve an originating device sending a wireless probing packet to a recipient device. If the probing packet is received correctly by the recipient device, then the originating device will transmit one or more data packets to the recipient device. The originating device may send these data packet(s) one by one until a predetermined number of data packets (e.g., one or more data packets) are lost. If such loss(es) occur, the originating device will transmit another wireless probing packet to the recipient device. In fact, the originating device may transmit such probing packets again and again until one is received correctly by the recipient device.

Thus, embodiments employ probing packets to detect burst noise. For instance, the probing packets may detect whether there is currently a "burst interference on period" (also referred to as an "on period") or a "burst interference off period" (also referred to as a "off period"). Based on such detections, an originating device may transmit data during an "off period", and back off (forego data transmission) during an "on period". In the "off period", the data rate may be the initial data rate determined according to conventional IEEE 802.11 techniques. The probe packet data rate should be chosen such that the successful transmission of the probe packet indicates a high probability of successful transmission of the data packet, but no higher. For example, the probe packet should have a data rate slightly higher than the initial data rate to account for the shorter packet length. Thus, the data rate of the probing packet may be selected in accordance with rate-adaptive techniques (e.g., based on the initial data rate of such adaptive techniques).

In embodiments, an originating device detects "on period" when a recipient device fails to receive one or more probing packets (e.g., one or more consecutive probing packets). In contrast, an originating device detects an "off period" when a recipient device successfully receives a probing packet. In embodiments, the recipient device indicates successful receipt through the transmission of an acknowledgment ("ACK") to the originating device.

Despite providing extra communications overhead (i.e., the employment of probing packets in addition to data packets), such techniques may advantageously reduce the occurrence of collisions. Moreover, through such techniques, downward data rate adjustments may be advantageously avoided. As a result, better performance may be achieved—even with the additional overhead.

With such techniques, successful receipt of a packet (e.g., a probing packet or a data packet) may be indicated by the originating device receiving a corresponding acknowledgment (ACK) from the recipient device. Conversely, a packet loss may be indicated by a failure of the originating device to receive a corresponding acknowledgment from the recipient device.

Figure 3:
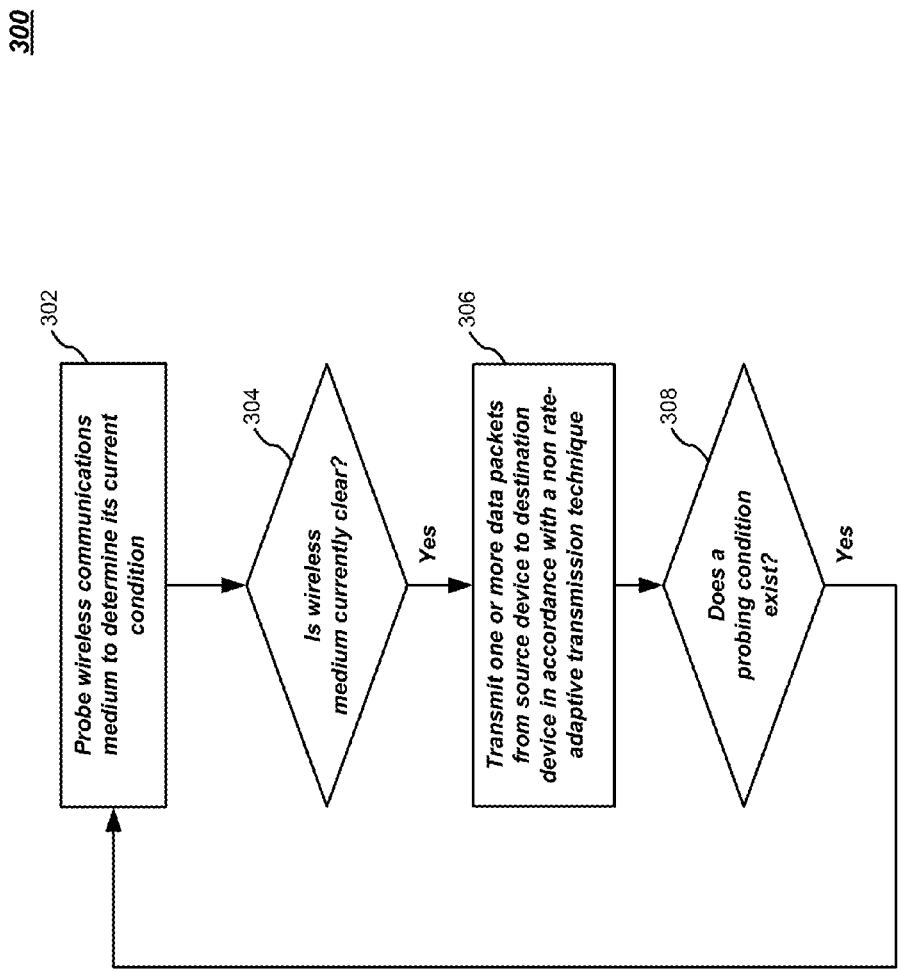
FIG. 3 is a logic flow diagram.

FIG. 3 illustrates an exemplary logic flow 300, which may be representative of operations executed by one or more embodiments described herein. Thus, this flow may be employed in the context of FIG. 2. Embodiments, however, are not limited to this context. Also, although FIG. 3 shows particular sequences, other sequences may be employed. Moreover, the depicted operations may be performed in various parallel and/or sequential combinations.

The logic flow of FIG. 3 is described with reference to a source device and a destination device. In the context of FIG. 2, the source device may be device 202 and the destination device may be device 204. Embodiments, however, are not limited to this context.

At a block 302, the source device probes a wireless communications medium (e.g., one or more IEEE 802.11 channels) to determine the channel's noise condition. As described herein, this may involve the source device sending one or more probing packets. Examples of probing packets include (but are not limited to) ready-to-send (RTS) packets and dedicated probing packets. In turn, the source device may wait for response(s) to these probing packet(s) from the destination device. Such responses may include (but are not limited to) clear-to-send (CTS) packets, dedicated response packets, and/or any other form of suitable transmission.

At a block 304, the source device determines whether the wireless communications medium is currently clear (e.g., free of burst noise or a busy condition). If so, then operation proceeds to a block 306.

At block 306, the source device transmits one or more data packets to the destination device. In embodiments, this data transmission does not employ rate adaptation techniques (such as the conventional IEEE 802.11 rate adaptation mechanism described above). When a data packet is successfully received by the destination device, the destination device transmits a acknowledgment (ACK) packet to the source device. Thus, the source device awaits an acknowledgement for each transmitted data packet receipt.

As indicated by a block 308, the source device determines whether a probing condition exists. An exemplary probing condition is the failure to receive data packet acknowledgment(s) from the destination device. For instance, if a number of unacknowledged data packets reaches a predetermined threshold, then the source device concludes that a probing condition exists.

As shown in FIG. 3, if a probing condition exists, then operation returns to block 302 and the wireless communications medium is probed again. Thus, the source device may halt its transmission of data packets and re-probe the communications medium for a later resumption of data packet transmission.

As described above, control packets may be employed for the medium to be probed. Various types of probing packets may be employed. For example, embodiments may employ RTS packets as probing packets. In this case, corresponding acknowledgment packets may be CTS packets. Alternatively or additionally, embodiments may employ Null-Data packets as probing packets, and/or ACK packets may be employed as corresponding acknowledgment packets. Further, embodiments may employ dedicated probing control packets, as described below with reference to FIGS. 4 and 5. Embodiments, however, are not limited to these examples.

Figure 4:
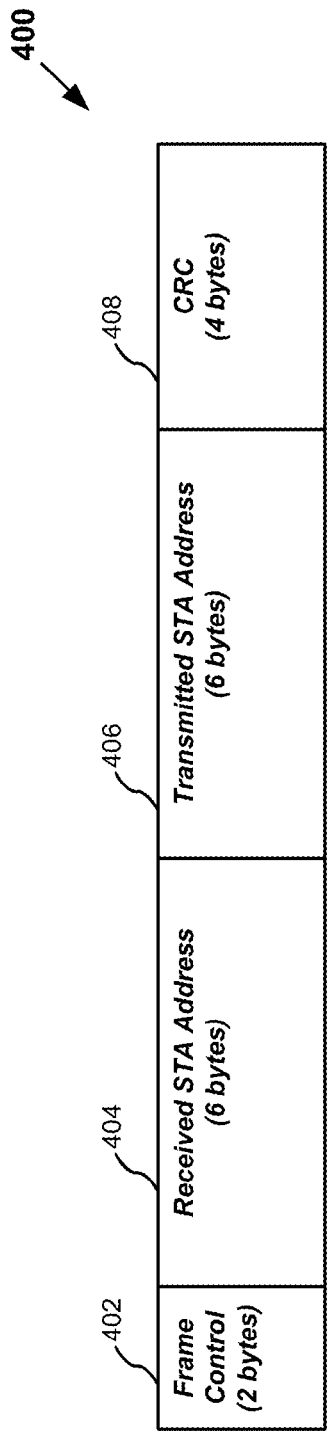
FIGS. 4 and 5 are diagrams of exemplary control packets.
Figure 5:
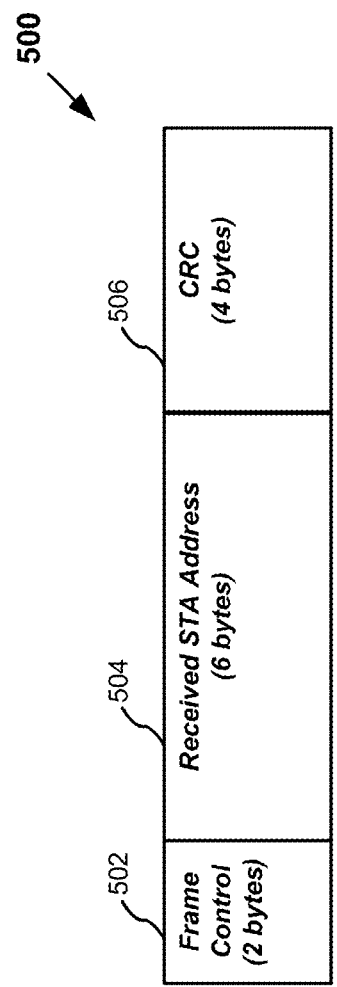

FIGS. 4 and 5 are diagrams showing exemplary control packets. In particular, FIG. 4 shows the format of an exemplary dedicated probing packet 400, and FIG. 5 shows the format of an exemplary dedicated probing response packet 500.

As shown in FIG. 4, probing packet 400 includes a frame control field 402, a received STA address field 404, a transmitted STA address field 406, and a cyclical redundancy check (CRC) field 408. Also, FIG. 4 provides exemplary sizes (in bytes) for each of these fields. Frame control field 402 identifies packet 400 as a probing packet. Received STA address field 404 indicates a designated recipient device, while transmitted STA address field 406 indicates an originating device. CRC field 408 allows for the detection of errors in packet 400.

FIG. 5 shows that probing response packet 500 includes a frame control field 502, a received STA address field 504, and a CRC field 506. Frame control field 502 identifies packet 500 as a probing response packet. Received STA address field 504 indicates the designated recipient device. CRC field 506 allows for the detection of errors in packet 500.

Thus, embodiments may employ a probing packet technique that offers advantages over traditional ready-to-send/clear-to-send (RTS/CTS) protection schemes. Such traditional RTS/CTS protection schemes involve a transmitting device (e.g., for a WiDi application, a WiFi module inside personal computer) sending a RTS packet. In response to receiving the RTS packet, the receiving device (e.g., a WiDi adaptor in a wireless display) sends a CTS packet.

In this RTS/CTS protection scheme, if a successful exchange of the RTS and CTS frames occurs, then the transmitting device can send a data packet after waiting for a predetermined time interval (e.g., a short interframe spacing (SIFS) interval). However, if the transmitting device does not receive the CTS packet within a certain time interval, the transmitting device retransmits an RTS packet after a back off time window.

Figure 6A:
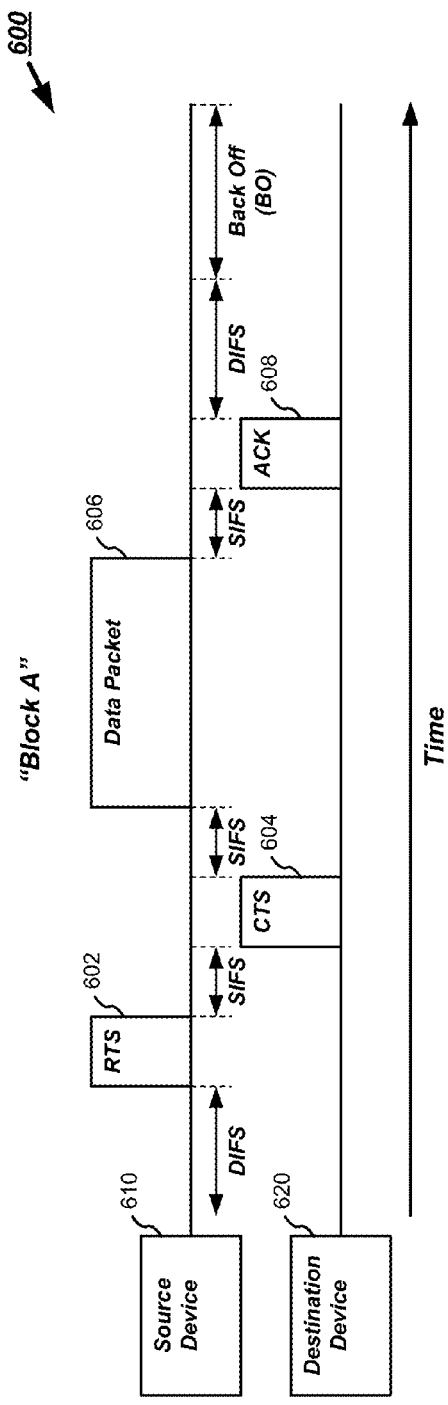
FIGS. 6A and 6B are diagrams showing a traditional RTS/CTS protection scheme.
Figure 6B:
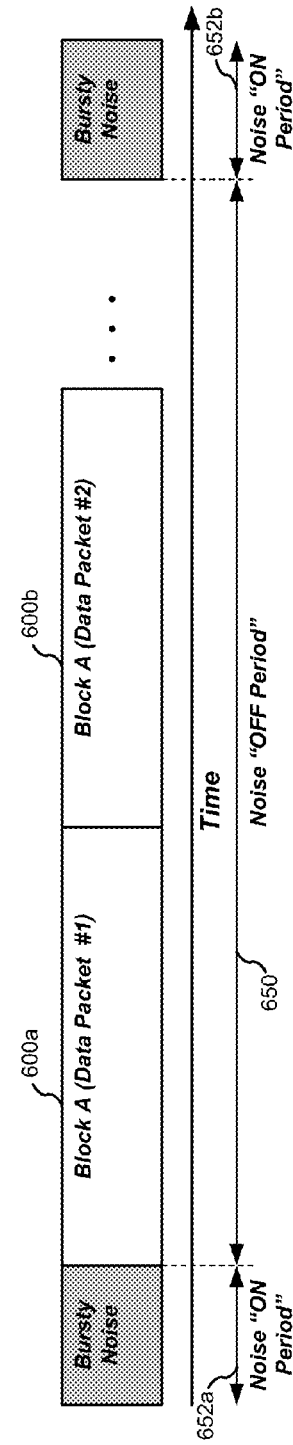

An example of this traditional RTS/CTS protection scheme is shown in FIGS. 6A and 6B. In particular, FIG. 6A is a diagram showing an exemplary RTS/CTS exchange 600 (also indicated as "block A"). In this exchange, a source device 610 sends an RTS packet 602 to a destination device 620 (after a distributed interframe space (DIFS) interval).

In turn, destination device 620 responds by sending a CTS packet 604 to source device 610 after a short interframe space (SIFS) interval.

Upon receipt of CTS packet 604, source device 610 waits a SIFS duration and transmits a data packet 606 to destination device 620. Upon receipt of this data packet, destination device 620 transmits an acknowledgment (ACK) packet 608 Following receipt of ACK 608, source device 610 may wait a DIFS interval, and a backoff (BO) time period.

FIG. 6B is a diagram showing an exemplary sequence of "Block A" exchanges 600. In particular, FIG. 6B shows two such exchanges (600a and 600b) being performed consecutively. Further, FIG. 6B shows these exchanges being performed during a bursty noise off period 650 that exists between two bursty noise on periods 652a and 652b.

This traditional RTS/CTS protection scheme of FIGS. 6A and 6B may be useful in certain situations. For instance, this traditional scheme may be useful in crowded areas (e.g., in areas having overlapping WLAN networks). Through this traditional scheme, every station on the same physical channel receives the network allocation vector (NAV) and defers its media access appropriately (even if the stations are configured to be on different networks). In addition, this traditional scheme is also helpful to solve the well known "hidden node" and "exposed node" problems.

However, there are drawbacks with using the traditional RTS/CTS protection scheme to deal with bursty noise environments. For instance, by "wrapping" every data packet with RTS and CTS packets, this scheme may consume excessive communications bandwidth. As a result, overall throughput may be reduced to unacceptable levels.

As described herein, embodiments may employ probing packets to detect whether a bursty noise "on period" or a bursty noise "off period" exists. Probing packets may be implemented in various ways. For example, RTS/CTS packets, as well as dedicated probing packets may be employed. However, any packet type may be used, as long as the transmitting and receiving devices employ the same probing packet definition and the packets can communicate the medium (channel) condition.

Examples of this probing mechanism are provided in FIG. 7A through FIG. 9.

Figure 7A:
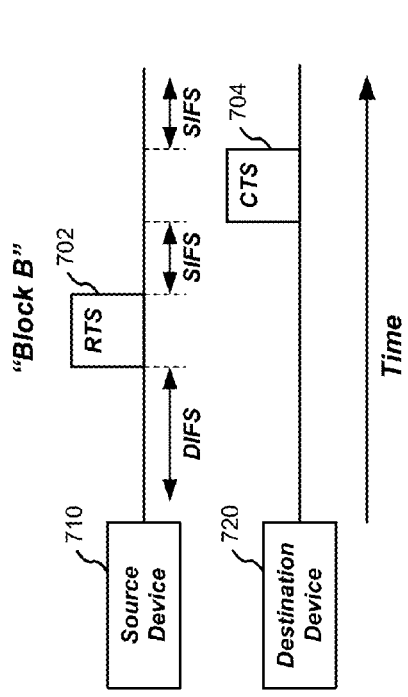
FIGS. 7A and 7B are diagrams of exemplary probing exchanges.
Figure 7B:
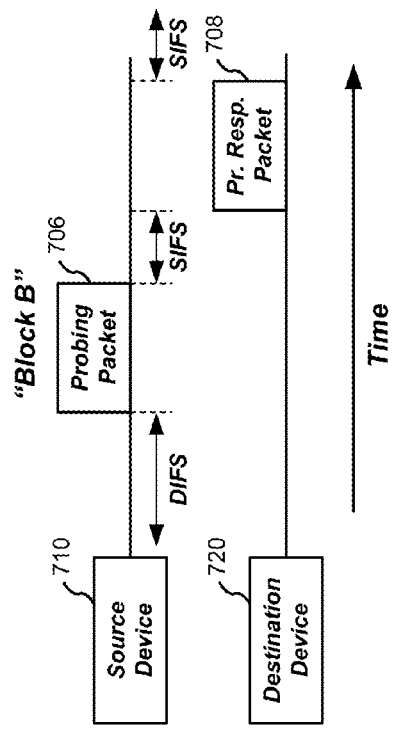

FIGS. 7A and 7B are diagrams illustrating exemplary probing packet exchanges. These exchanges are also indicated herein as "Block B". In particular, FIG. 7A shows probing packets being implemented as RTS/CTS packets. In contrast, FIG. 7B shows the employment of dedicated probing packets.

For instance, in FIG. 7A, a source device 710 (following a DIFS interval) sends an RTS packet 702 to a destination device 720 as a probing packet. Upon receipt of this RTS packet, destination device 720 responds (following a SIFS interval) by sending source device 710 a CTS packet 704. As shown in FIG. 7A, a SIFS interval follows CTS packet 704. FIG. 7B employs the same exchange as FIG. 7A. However, in FIG. 7B, a dedicated probing packet 706 and a dedicated probing response packet 708 are employed. These packets may be formatted in accordance with the examples of FIGS. 4 and 5. Embodiments, however, are not limited to these examples.

Figure 8:
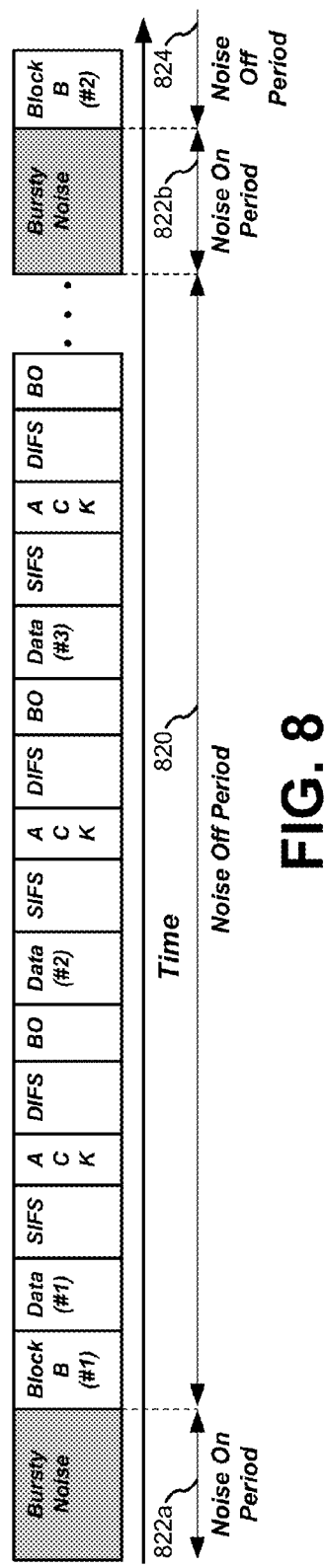
FIGS. 8 and 9 are diagrams of exemplary device interactions.

FIG. 8 is a diagram illustrating an exemplary exchange between a source device and destination device that employs the probing techniques described herein. In particular, FIG. 8 shows that during a noise off period, a "Block B" exchange is performed (indicated as "Block B (#1)"). As described above with reference to FIGS. 7A and 7B, the Block B exchange involves a source device sending a probing packet, and the destination device responding with a corresponding probing response.

Following the Block B exchange, FIG. 8 shows a first data packet (indicated as Data (#1)) being sent from the source device to the destination device. Following this data packet is a SIFS interval, an ACK transmission from the destination device to the source device, a DIFS interval, and a backoff (BO) interval. FIG. 8 shows that this is performed again for a second data packet (indicated as data (#2)), and a for a third data packet (indicated as data (#3)).

FIG. 8 shows that such data transmissions occur within a noise off period 820, which is between noise on periods 822a and 822b. Further, once noise on period 822b begins, the source device may not receive acknowledgment(s) of data packets from the destination device. Thus, the source device may resume probing. For instance, FIG. 8 shows that a Block B exchange (indicated as "Block B (#2)") occurs within a subsequent noise off period 824. As described herein, success of such an exchange indicates a burst noise OFF period, and data transmission according to the techniques described herein may be performed.

Figure 9:
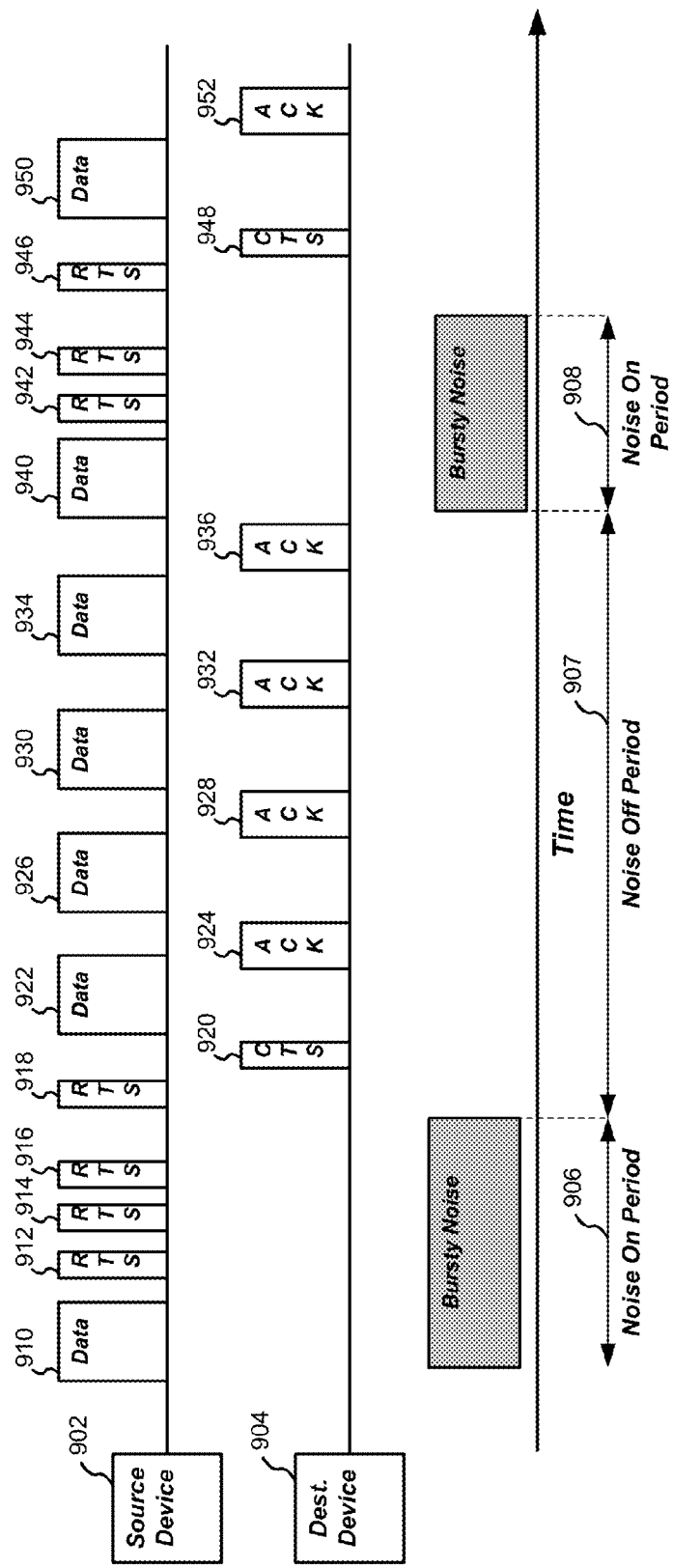

FIG. 9 is a diagram illustrating a further exchange between a source device 902 and a destination device 904. This exchange employs probing techniques, as described herein. As shown in FIG. 9, source device 902 sends a data packet 910 to destination device 904 during a noise on period 906. However, because of noise, source device 902 does not receive a corresponding acknowledgment from destination device 904.

Accordingly, source device 902 begins to probe the medium. More particularly, source device 902 sends RTS packets 912, 914, 916, and 918 to destination device 904. As shown in FIG. 9, RTS packet 918 is sent during a noise off period 907. Accordingly, source device 902 receives a corresponding probe response in the form of CTS packet 920.

Based on the receipt of CTS packet 920, source device 902 sends a sequence of data packets to destination device 904. In particular, FIG. 9 shows source device 902 sending data packets 922, 926, 930, and 934, and 940. For each of these data packets (except data packet 940), source device receives a corresponding acknowledgment (ACK) from destination device 904. These ACKs are shown in FIG. 9 as ACKs 924, 928, 932, and 936.

FIG. 9 shows that, for data packet 940, source device 902 does not receive a corresponding acknowledgment from destination device 904. Therefore, source device 902 begins probing the medium again. For instance, FIG. 9 shows source device 902 sending (as probing packets) RTS packets 942, 944, and 946 to destination device 904.

Following noise on period 908, source device 902 receives a probing response (CTS packet 948) from destination device 904. Accordingly, source device 902 recommences data transmission by sending a data packet 950 to destination device 904. In response, source device 902 receives a corresponding ACK 952 from destination device 904.

Thus, as shown in FIG. 9, a wireless communications device may use probing packets to probe a wireless channel (wireless medium). From this probing, the device may detect whether the wireless medium is currently exhibiting bursty interference. In other words, the device detects whether it is currently a bursty interference "on period" or "off period".

When the wireless communications device detects an "off period", then it may commence (or recommence) transmitting data packets. The device may transmit data packets one by one until the retransmission of a particular data packet occurs more than a predetermined number of times (also referred to as N times). Such an occurrence indicates the existence of an "on period" for bursty interference.

In embodiments, a probing packet (e.g., an RTS packet) may reserve the communications medium for a particular time duration. However, embodiments may avoid reserving the medium for much longer of a time duration than what is needed to receive the expected probing response packet (e.g., CTS packet). This is because, although the intended receiver may be jammed, other devices may not be experiencing this problem and would like to use the medium.

For instance, by keeping the communications medium reserved, other network devices would be unable to use the communications medium until a contention-free-end packet is sent to release the medium. Thus, in embodiments, a probing packet (e.g., an RTS packet) may reserve the medium for the expected CTS and the preambles of the source device's data packet.

Figure 10:
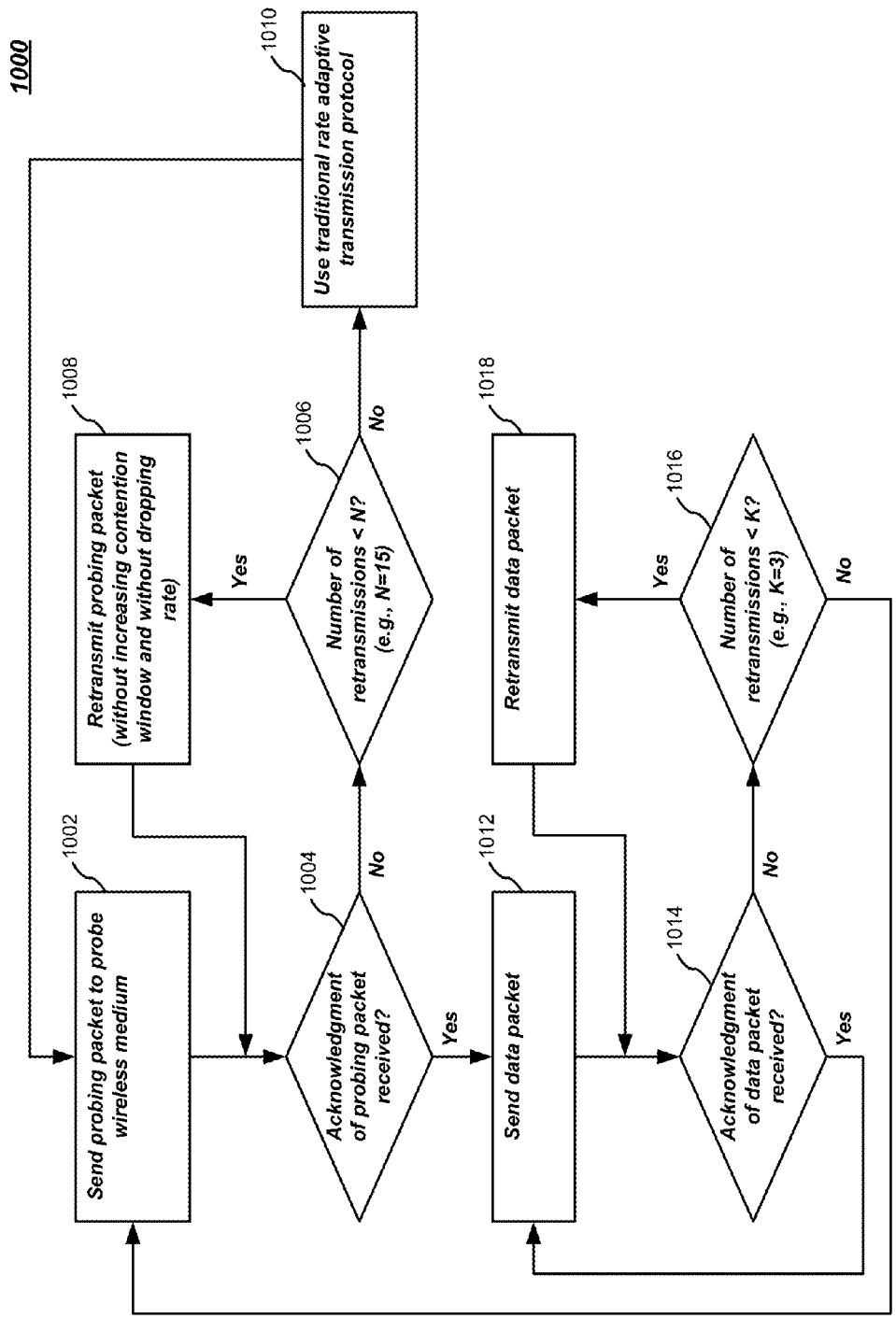
FIG. 10 is a logic flow diagram.

FIG. 10 illustrates an exemplary logic flow 1000, which may be representative of operations executed by one or more embodiments. These operations may be employed in the environment of FIG. 2. Embodiments, however, are not limited to this context. Although FIG. 10 shows a particular sequence, other sequences may be employed. Also, the depicted operations may be performed in various parallel and/or sequential combinations.

The logic flow of FIG. 10 is described with reference to a source device and a destination device. In the context of FIG. 2, the source device may be device 202 and the destination device may be device 204. However, embodiments are not limited to this context.

At a block 1002, the source device sends a probing packet to the destination device. In turn, the source device determines (at a block 1004) whether an acknowledgment of the probing packet has been received from the destination device. If so, then operation proceeds to a block 1012. Otherwise, operation proceeds to a block 1006.

At block 1006, the source device determines whether the probing packet has been retransmitted a number of times that is less than a probing retransmission threshold value, N. If so, then operation proceeds to a block 1008. Otherwise, operation proceeds to a block 1010. For purposes of illustration, FIG. 10 shows threshold N being 15. However, other values of N may be employed.

At block 1008, the source device retransmits the probing packet. FIG. 10 shows that, following such retransmission, operation returns to block 1004. Thus, at this point, the source device will determine, again, whether an acknowledgment of the probing packet is received.

As described above, block 1010 is performed when a number of probing packet retransmissions reaches a threshold value, N. FIG. 10 shows that, at block 1010, the source device employs a conventional data transmission protocol. More particularly, the source device may transmit data and employ short term rate adjustments (based on whether acknowledgments are received) according to conventional IEEE 802.11 techniques. As shown in FIG. 10, operation may return from block 1010 to block 1002 (e.g., after the success of the packet transmission or a predetermined amount of time).

As described above, block 1012 is performed when the source device determines (at block 1004) that an acknowledgment of a probing packet is received. At this block, the source device wirelessly sends a data packet to the destination device.

Following this, the source device determines (at a block 1014) whether it has received an acknowledgment of the data packet from the destination device. If so, then operation returns to block 1012, where the source device may send a further data packet to the destination device.

However, if the source device does not receive an acknowledgment of the data packet, then operation may proceed from block 1014 to a block 1016. At block 1016, the source device determines whether the data packet has been retransmitted a number of times that is less than a data retransmission threshold value, K. If so, then operation proceeds to a block 1018. Otherwise, operation returns to block 1002. For purposes of illustration, FIG. 10 shows the threshold K having a value of 3. However, other values of K may be employed.

As shown in FIG. 10, the source device retransmits the data packet at a block 1018. Following this, operation proceeds to block 1014.

FIG. 10 shows that embodiments provide techniques that may supplement existing rate-adaptation algorithms. While such existing algorithms may be adequate at adapting to slower changes in signal power and noise, the new techniques provided in embodiments advantageously allow for bursty noise to be avoided.

Thus, the flow of FIG. 10 may essentially be considered to include two loops. This first loop proceeds along blocks 1002, 1004, 1006, 1010, and back to 1002. This loop involves a conventional rate adaptive scheme. Thus, when the threshold N (of block 1006) approaches zero, performance that is very close to the conventional rate adaptive techniques may occur. Moreover, through this flow, such conventional techniques may be employed to determine the best initial data rate periodically based on statistics of packet success.

The second loop proceeds along blocks 1012, 1014, 1016 and 1018. This non-rate adaptive loop may employ a data rate (for probing packets and data packets) that is (or is based upon) an initial data selected in accordance with a rate adaptive technique at block 1010 As described above, block 1010 is performed during bursty noise-off states. Block 1010 may determine this initial data rate such that the successful transmission of the probe rate indicates a high successful transmission probability of the data packet, but not excessive.

Figure 11:
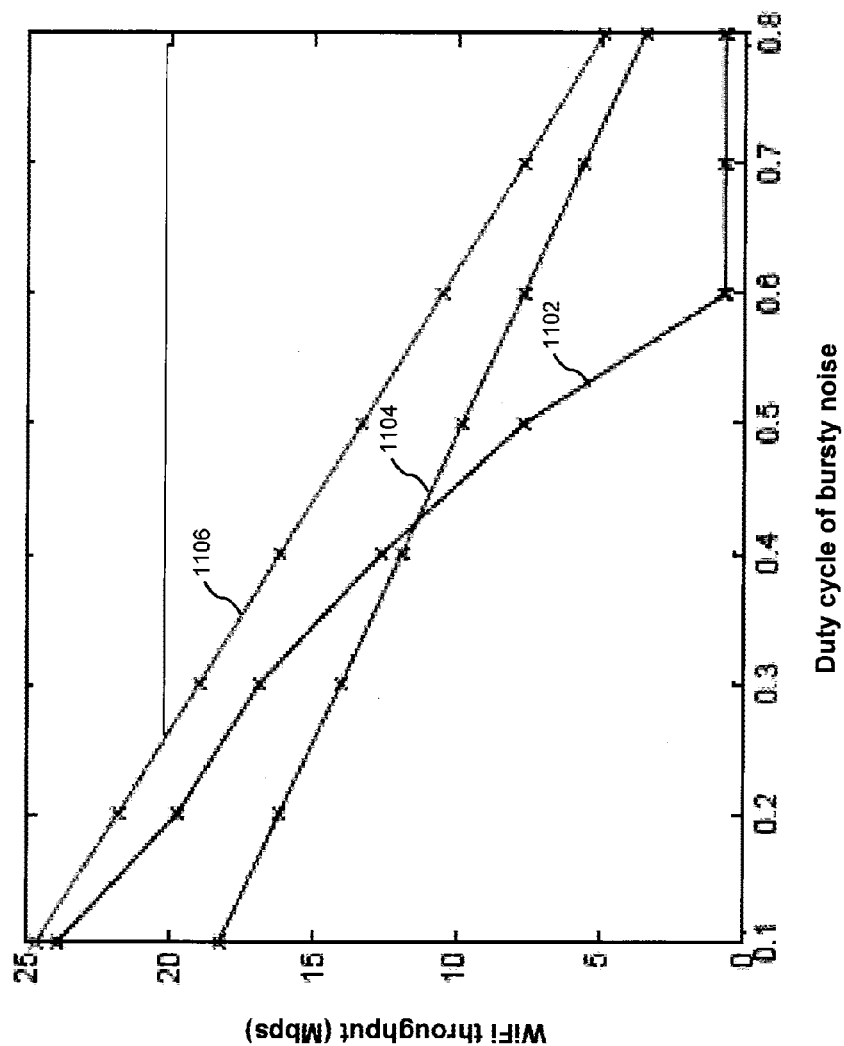
FIG. 11 is a graph showing performance characteristics.

FIG. 11 is a graph 1100 showing simulated performance characteristics of three different transmission techniques across a range of burst noise duty cycles. More particularly, graph 1100 includes a curve 1102 showing throughput characteristics for communications employing the existing WiFi rate adaptation technique (without probing techniques or any RTS/CTS protection), a curve 1104 showing throughput characteristics for communications employing a traditional RTS/CTS protection scheme, and a curve 1106 showing throughput characteristics for communications employing the probing-based techniques described herein with reference to FIG. 10.

In the generation of these curves, noise was simulated to have a duration of 16.6 milliseconds, which is a typical length of microwave oven interference. As shown in FIG. 11, the duty cycle of bursty noise plays a significant role as it determines the noise's "on" and 'off' periods.

For the data of curve 1106, probing packets and probing response packets employ the same structure as RTS and CTS. These packets are transmitted at a physical rate of 24 Mbps (mega bits per second). The employed contention window has a minimum of 7 and maximum of 31 (which may be employed in WiDi applications). Channel condition is assumed to be good when bursty noise is off and extremely bad when the bursty noise is on.

In the existing WiFi rate adaptation mechanism of curve 1102, the data rate is automatically dropped once a retransmission occurs. As a result, the WiFi packet needs a longer duration to be transmitted. As shown in FIG. 11, this mechanism performs worst when the bursty noise is on for a long time (has a high duty cycle) and the rate has been dropped several times.

The traditional RTS/CTS protection mechanism of curve 1104 provides more control over the use of shared wireless channel/medium and minimizes collisions from RF interference by adding significant overhead since a RTS/CTS exchange has to be done for every packet—even in the burst noise off periods. This excessive overhead is in contrast to the probing techniques described herein, in which a probing packet exchange only occurs once during a burst noise off period.

As shown in FIG. 11, the probing techniques described herein (curve 1106) may provide throughput that is greater than the throughput provided by the other techniques. For instance, curve 1106 shows throughput that is consistently 35% to 40% higher than that of curve 1104 (the traditional RTS/CTS scheme). Also, curve 1106 has significantly higher throughput over curve 1102 (existing WiFi rate adaptation technique) when the bursty noise duty cycle of the bursty noise is greater than 40%.

Figure 12:
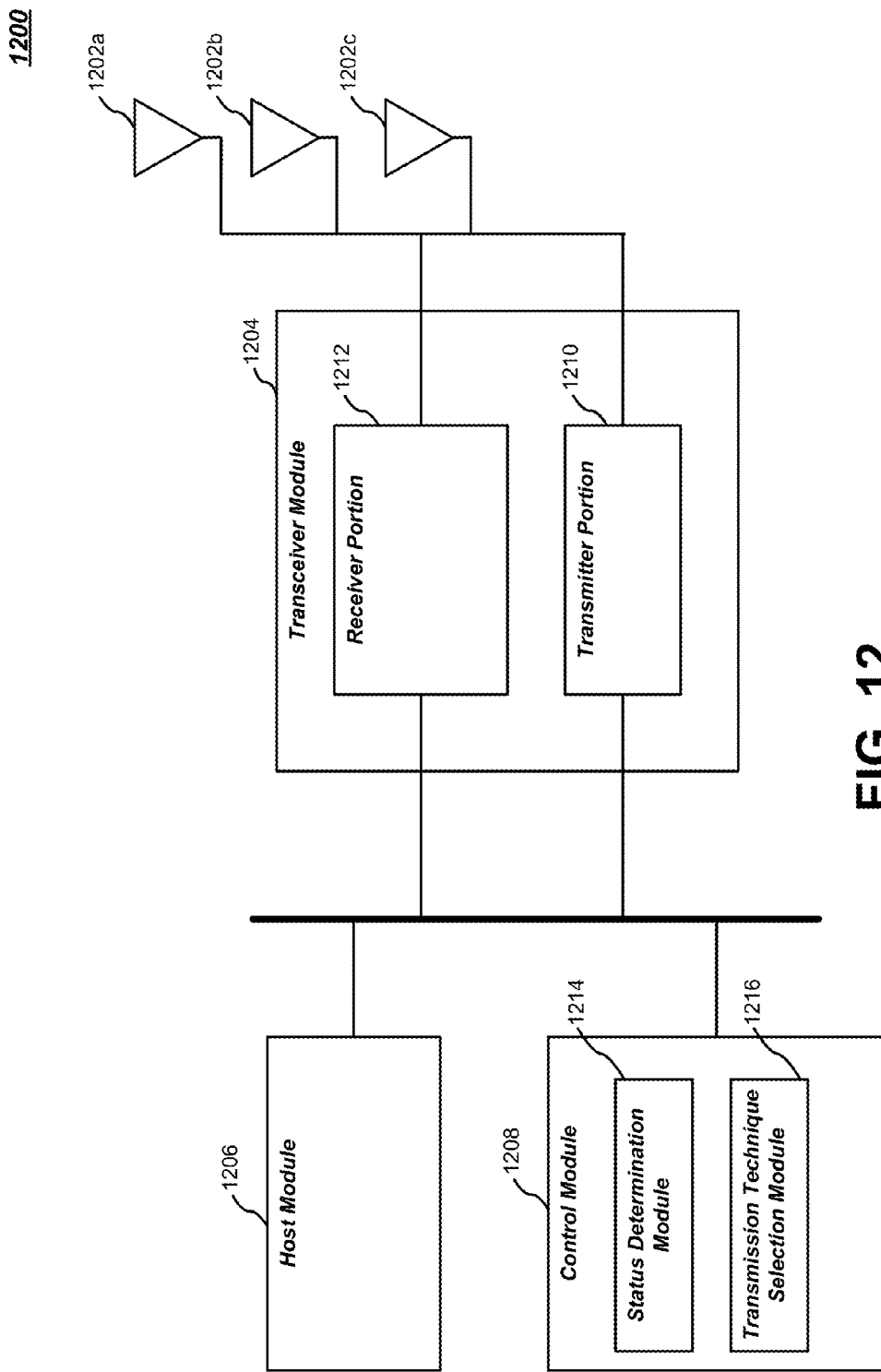
FIG. 12 is a diagram of an exemplary implementation within a wireless communications device.

FIG. 12 is a diagram of an implementation 1200 that may be included in a wireless device, such as a base station (e.g., any of BSs 102a-g) and/or a mobile station (e.g., any of MSs 104a-h). Implementation 1200 may include various elements. For example, FIG. 12 shows implementation 1200 including multiple antennas 1202a-c, a transceiver module 1204, a host module 1206, and a control module 1208. These elements may be implemented in hardware, software, or any combination thereof.

Antennas 1202a-c provide for the exchange of wireless signals with remote devices. Although three antennas are depicted, any number of antennas (e.g., one or more) may be employed. Also, embodiments may employ one or more transmit antennas and one or more receive antennas. Such multiple antenna arrangements may be employed for beamforming and/or the employment of multiple spatial streams with a remote device.

Transceiver module 1204 provides for the exchange of information with other devices. Thus, transceiver module 1204 may (through antennas 1202a-c) send and receive various transmissions, as described herein. Such transmissions may include (but are not limited to) probing packets and data packets.

As shown in FIG. 12, transceiver module 1204 includes a transmitter portion 1210, and a receiver portion 1212. During operation, transceiver module 1204 provides an interface between antennas 1202a-c and other elements, such as host module 1206, and control module 1208. For instance, transmitter portion 1210 receives symbols from such elements, and generates corresponding signals for wireless transmission by one or more of antennas 1202a-c. This may involve operations, such as modulation, amplification, and/or filtering. However, other operations may be employed.

Conversely, receiver portion 1212 obtains signals received by one or more of antennas 1202a-c and generates corresponding symbols. In turn, these symbols may be provided to elements, such as host module 1206 and control module 1208. This generation of symbols may involve operations, including (but not limited to) demodulation, amplification, and/or filtering.

The signals generated and received by transceiver module 1204 may be in various formats. For instance, these signals may be modulated in accordance with an orthogonal frequency division multiplexing (OFDM) scheme. However, other schemes and formats (e.g., QPSK, BPSK, FSK, etc.) may be employed.

To provide such features, transmitter portion 1210 and receiver portion 1212 may each include various components, such as modulators, demodulators, amplifiers, filters, buffers, upconverters, and/or downconverters. Such components may be implemented in hardware (e.g., electronics), software, or any combination thereof.

The symbols exchanged between transceiver module 1204 and other elements may form messages or information associated with one or more protocols, and/or with one or more user applications. Thus, these elements may perform operations corresponding to such protocol(s) and/or user application(s). Exemplary protocols include (but are not limited to) various media access control and discovery protocols. Exemplary user applications include telephony, messaging, e-mail, web browsing, content (e.g., video and audio) distribution/reception, and so forth.

Moreover, in transmitting signals, transceiver module 1204 may employ various access techniques. For example, transceiver module 1204 may employ a duplexing technique, such as time division duplexing (TDD), frequency division duplexing (FDD), and so forth. Embodiments, however, are not limited to such techniques.

In embodiments, control module 1208 may perform various operations described herein. For instance, FIG. 12 shows control module 1208 including a status determination module 1214 and a transmission technique selection module 1216.

Status determination module 1214 determines a current status of a wireless communications medium. For instance, based on probing packet(s) transmitted by transceiver module 1204 and probing response packet(s) (if any) received by transceiver module 1204, status determination module 1214 may determine whether the communications medium is clear.

Based on such determinations, transmission technique selection module 1216 may select a technique for transmitting data packets. As described herein, such selections may be between a non rate-adaptive technique and a rate adaptive technique.

Moreover, status determination module 1214 may monitor the status of data transmissions. For instance, status determination module 1214 may count unacknowledged data packets and determine that transceiver module 1204 must probe the communications medium before any further data packet transmissions occur.

Host module 1206 may exchange symbols with transceiver module 1204 that correspond to wireless signals exchanged with remote devices. These symbols may form messages or information associated with one or more protocols, and/or one or more user applications. Thus, host module 1206 may perform operations corresponding to such protocol(s) and/or user application(s). Exemplary protocols include various media access, network, transport and/or session layer protocols. Exemplary user applications include telephony, messaging, e-mail, web browsing, content (e.g., video and audio) distribution/reception, and so forth.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a storage medium or article which is machine readable. The storage medium may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

As described herein, embodiments may include storage media or machine-readable articles. These may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A method, comprising:
transmitting one or more probing packets to detect burst noise interference in a communication medium; and
based on a responsive outcome to the one or more probing packets, selecting between a rate-adaptive transmission technique and a non rate-adaptive transmission technique, wherein the non rate-adaptive transmission technique comprises: a) using a fixed data transmission rate for data transmission when no burst noise interference is currently detected in the communication medium, b) stopping data transmission upon detecting burst noise interference in the communication medium, and c) resuming data transmission at the fixed data transmission rate upon detecting via the one or more probing packets, an absence of the burst noise interference in the communication medium.

2. The method of claim 1: wherein the rate-adaptive transmission technique is selected when a predetermined number of failed non rate-adaptive retransmissions occurs due to burst noise interference in the communication medium.

3. The method of claim 1: wherein a data rate of the one or more probing packets and a data rate of the non rate-adaptive transmission technique are determined in accordance with the rate-adaptive transmission technique.

4. The method of claim 1 further comprising:
retransmitting the one or more probing packets; and
selecting the rate-adaptive transmission technique when a number of the probing packet retransmissions reaches a threshold value.

5. The method of claim 1, wherein each of the one or more probing packets is a Null-Data packet.

6. The method of claim 1, wherein said source device and said destination device are included in an IEEE 802.11 wireless local area network (WLAN).

7. The method of claim 1, wherein the burst noise interference has a frequency in a range of about 2.4 GHz to about 2.5 GHz.

8. The method of claim 1, wherein the burst noise interference comprises an on/off sequence of radio frequency noise bursts.

9. The method of claim 1, wherein the burst noise interference comprises a pattern of noise pulses having a duty cycle in a range of about 10% to about 60%.

10. The method of claim 1, wherein the burst noise interference is generated by at least one of a microwave device, a Bluetooth device, or a WiFi device.

11. A method, comprising:
using one or more probing packets to determine whether a wireless communications medium is currently clear of radio frequency (RF) interference; and
when said determining indicates that the wireless communications medium is currently clear, transmitting one or more data packets from a source device to a destination device via the wireless communications medium, wherein said transmitting is in accordance with a non rate-adaptive technique, wherein the non rate-adaptive technique comprises:
using a fixed data transmission rate for transmitting the one or more data packets via the wireless communication medium;
upon detecting that the destination device has failed to receive a pre-determined number of the one or more data packets, inferring that the RF interference is present in the wireless communications medium;
transmitting the one or more probing packets to determine whether the wireless communications medium is clear of the RF interference; and
resuming data transmission at the fixed data transmission rate when the RF interference is no longer present in the wireless communications medium.

12. The method of claim 11, wherein the one or more probing packets are transmitted to the destination device, and wherein said determining whether the wireless communications medium is currently clear comprises:
for each of the one or more probing packets, waiting for a corresponding probing response packet from the destination device.

13. The method of claim 12, wherein said determining whether the wireless communications medium is currently clear comprises concluding the wireless communications medium is unclear when an unreceived probing response packet count reaches a threshold value.

14. The method of claim 12, wherein each of the one or more probing packets is a ready to send (RTS) packet, and each corresponding probing response packet is a clear to send (CTS) packet.

15. The method of claim 11, further comprising waiting for an acknowledgement from the destination device for each of the one or more data packets, and when a number of unreceived acknowledgments reaches a threshold value, using the one or more probing packets to again determine whether the wireless communications medium is clear of radio frequency (RF) interference.

16. An apparatus, comprising:
a status determination module configured to use one or more probing packets to make a determination regarding whether a wireless communications medium is currently clear of burst noise interference; and
a transceiver module configured to transmit one or more data packets to a destination device in accordance with a non rate-adaptive technique when the status determination module determines that the wireless communications medium is currently clear, wherein the non rate-adaptive technique comprises:
using a fixed data transmission rate for transmitting the one or more data packets via the wireless communication medium;
upon detecting that the destination device has failed to receive a pre-determined number of the one or more data packets, inferring that the burst noise interference is present in the wireless communications medium;

transmitting the one or more probing packets to determine whether the wireless communications medium is clear of the burst noise interference; and resuming data transmission at the fixed data transmission rate when the burst noise interference is no longer present in the wireless communications medium.

17. The apparatus of claim 16:

wherein the transceiver module is configured to transmit the one or more probing packets upon detecting a failure to receive at least one of the one or more data packets in a destination device.

18. The apparatus of claim 17, wherein each of the one or more probing packets is a ready-to-send (RTS) packet.

19. A non-transitory computer-readable storage medium having stored thereon a computer-executable program comprising instructions for:

transmitting one or more probing packets to detect burst noise interference in a communication medium; and based on a responsive outcome to the one or more probing packets, selecting between a rate-adaptive transmission technique and a non rate-adaptive transmission technique, wherein the non rate-adaptive transmission technique comprises: a) using a fixed data transmission rate for data transmission when no burst noise interference is detected in the communication medium, b) stopping data transmission upon detecting burst noise interference in the communication medium, and c) resuming data transmission at the fixed data transmission rate upon detecting cessation of the burst noise interference in the communication medium.

* * * * *